W. SIMPSON & E. BIRNIE.
WELDING CLAMP.
APPLICATION FILED MAY 1, 1914.
1,113,700.
Patented Oct. 13, 1914.
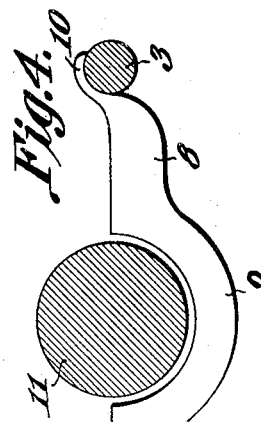
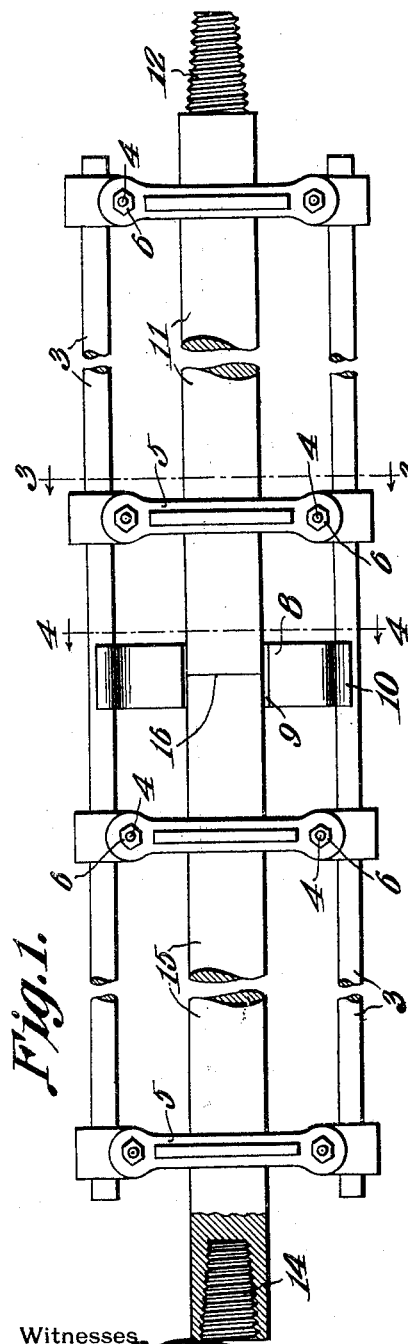
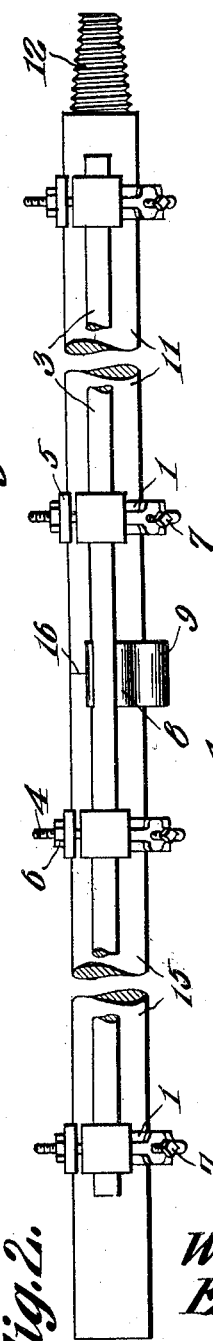
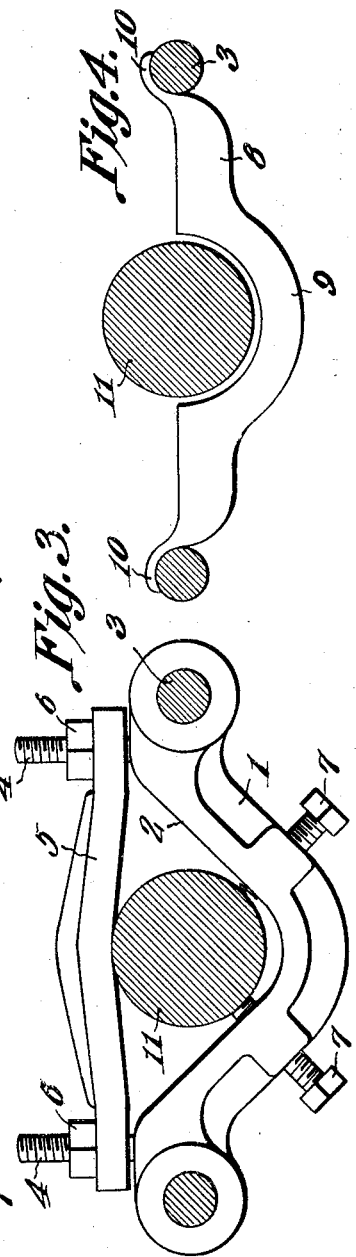
Walter Simpson and
Earl Birnie,
Inventors

UNITED STATES PATENT OFFICE.

WALTER SIMPSON AND EARL BIRNIE, OF NEWARK, OHIO.

WELDING-CLAMP.

1,113,700. Specification of Letters Patent. Patented Oct. 13, 1914.

Application filed May 1, 1914. Serial No. 835,732.

*To all whom it may concern:*

Be it known that we, WALTER SIMPSON and EARL BIRNIE, citizens of the United States, residing at Newark, in the county of Licking, State of Ohio, have invented new and useful Welding-Clamps, of which the following is a specification.

By way of explanation it may be stated that drilling stems used in connection with gas, oil or other Artesian wells, are commonly provided at one end with a threaded tip and at the other end with a threaded socket. The tip and the socket become damaged after a comparatively brief period of use and must be renewed. The common practice is to weld onto one end of the stem, a section containing a new tip or a new socket. It is obvious that this section must be alined with the stem, when the section is welded to the stem and unless the operation is carried on in a shop having a full equipment of somewhat complicated appliances, an alinement of the stem with the new section is secured only with considerable difficulty.

The present invention aims to provide a clamp whereby the body portion of the stem and the new section may be readily held in alinement during the welding operation.

With the above and other objects in view which will appear as the description proceeds, the invention resides in the combination and arrangement of parts and in the details of construction hereinafter described and claimed it being understood that changes in the precise embodiment of the invention herein disclosed can be made within the scope of what is claimed without departing from the spirit of the invention.

In the accompanying drawing:—Figure 1 shows the invention in top plan, parts being broken away and sectioned; Fig. 2 shows the invention in side elevation; Fig. 3 is a cross section on the line 3—3 of Fig. 1; Fig. 4 is a cross section on the line 4—4 of Fig. 1.

In carrying out the present invention there is provided a frame, the same including a plurality of cross bars 1 concaved as shown at 2 in Fig. 3. The frame further includes longitudinal rods 3 which pass through the ends of the cross bars 1. The cross bars 1 are equipped adjacent their ends with outstanding, threaded studs 4, passing through openings in the ends of clamps 5, nuts 6 being mounted upon the studs 4 and coöperating with the clamps 5 to enable the latter to exercise their obvious functions. Threaded into the cross bars 1 are angularly disposed set screws 7.

The invention further includes a boxing support 8, concaved in its intermediate portion as indicated at 9 and provided at its ends with fingers 10 adapted to be received upon the longitudinal rods 3 of the frame.

The numeral 11 indicates a drilling stem, provided at one end with a threaded tip 12 and equipped at its other end with a threaded socket 14. Let it be supposed that the socket 14 has become damaged and that the socket must be renewed. Under such circumstances, a section 15 containing a new socket 14 is welded onto the main stem 11, ordinarily by a gas process.

In carrying out the welding operation above described, the stem 11 is mounted in the concavities 2 of certain of the cross bars and is held in place by means of the clamps 5 and the nuts 6. The section 15 which contains the new socket 14 is mounted upon others of the cross bars 1 and is lined up with the stem 11 by manipulating the set screws 7, the section 15 being held in place by the appropriate clamps 5.

The numeral 16 indicates the welding line between the stem 11 and the section 15. The boxing support 8 is slid along the longitudinal rods 3 until it is opposite the welding line 16 and then a boxing of clay (not shown) is built up on the support 8. Then, the welding operation is carried out.

It will be observed that through the instrumentality of the simple structure herein disclosed, the parts of the drilling stem may be lined up properly, while the welding process is being carried out.

Having thus described the invention, what is claimed is:—

1. In a welding clamp, a frame comprising cross bars and longitudinal rods connecting the cross bars; clamps coöperating with the cross bars; and a boxing support disposed substantially parallel to the cross bars, the boxing support being provided with means for slidably engaging the longitudinal rods to permit the boxing support to be adjusted in the direction of the length of the rods.

2. In a welding clamp, a frame; spaced gripping means on the frame; and a boxing support mounted on the frame for movement longitudinally of the frame.

3. In a welding clamp, a frame; spaced grips coöperating with the frame, and independently movable, converging alinement devices mounted in the frame for adjustment toward and away from the grips.

4. In a welding clamp, a frame comprising cross bars; longitudinal rods connecting the ends of the cross bars; threaded studs on the cross bars; clamps through which the threaded studs pass; nuts adjustable on the studs and adapted to engage the clamps; and a boxing support disposed transversely of the longitudinal rods, the boxing support terminating in fingers which engage the rods to permit the boxing support to be adjusted longitudinally of the rods.

5. In a welding clamp, a frame comprising cross bars and longitudinal rods connecting the cross bars; a clamp on each cross bar; adjusting devices movable in the cross bars toward and away from the clamps of the respective cross bars; and a boxing support disposed substantially parallel to the cross bars, the boxing support being provided with means for slidably engaging the longitudinal rods, to permit the boxing support to be adjusted in the direction of the length of the rods.

In testimony that we claim the foregoing as our own, we have hereto affixed our signatures in the presence of two witnesses.

WALTER SIMPSON.
EARL BIRNIE.

Witnesses:
A. L. ENGLE,
RALPH NORPELL.

---

Copies of this patent may be obtained for five cents each, by addressing the "Commissioner of Patents, Washington, D. C."